United States Patent
Bruck et al.

(10) Patent No.: US 10,926,505 B2
(45) Date of Patent: Feb. 23, 2021

(54) STOCK SUPPLY ASSEMBLY AND METHOD FOR LOADING A DUNNAGE CONVERSION MACHINE

(71) Applicant: Ranpak Corp., Concord Township, OH (US)

(72) Inventors: William D. Bruck, Lyndhurst, OH (US); William Toth, Burton, OH (US); Shawnasee E. Burns, Rock Creek, OH (US)

(73) Assignee: Ranpak Corp., Concord Township, OH (US)

( * ) Notice: Subject to any disclaimer, the term of this patent is extended or adjusted under 35 U.S.C. 154(b) by 215 days.

(21) Appl. No.: 15/573,775

(22) PCT Filed: May 13, 2016

(86) PCT No.: PCT/US2016/032382
§ 371 (c)(1),
(2) Date: Nov. 13, 2017

(87) PCT Pub. No.: WO2016/183454
PCT Pub. Date: Nov. 17, 2016

(65) Prior Publication Data
US 2018/0126685 A1    May 10, 2018

Related U.S. Application Data

(60) Provisional application No. 62/315,967, filed on Mar. 31, 2016, provisional application No. 62/161,122, filed on May 13, 2015.

(51) Int. Cl.
*B31D 5/00* (2017.01)
*B66F 7/06* (2006.01)
(Continued)

(52) U.S. Cl.
CPC ......... *B31D 5/0047* (2013.01); *B31D 5/0039* (2013.01); *B66F 7/0616* (2013.01);
(Continued)

(58) Field of Classification Search
CPC ...... B31D 5/00; B31D 5/0039; B31D 5/0043; B31D 5/0047; B31D 2205/0005;
(Continued)

(56) References Cited

U.S. PATENT DOCUMENTS 2,545,515 A * 3/1951 Mast ..................... A47B 9/00
108/138
4,249,749 A    2/1981 Collier
(Continued)

FOREIGN PATENT DOCUMENTS

CN    1134687 A    10/1996
CN    1268473 A    10/2000
(Continued)

OTHER PUBLICATIONS

Written Opinion of the International Searching Authority for International Application No. PCT/US2016/032382.
Second Chinese Office Action dated Apr. 10, 2019.

*Primary Examiner* — Hemant Desai
*Assistant Examiner* — Jacob A Smith
(74) *Attorney, Agent, or Firm* — Renner, Otto, Boisselle & Sklar, LLP

(57) ABSTRACT

A stock supply assembly for a dunnage conversion machine includes a stock material support having a support structure, such as a shelf for a stack of fan-folded sheet stock material. The shelf is movable between a relatively lower loading position and a relatively higher operating position vertically displaced relative to the loading position. In the process, the
(Continued)

support structure maintains a consistent orientation as the support structure moves between the loading position and the operating position.

16 Claims, 11 Drawing Sheets

(51) Int. Cl.
*F16M 11/04* (2006.01)
*F16M 11/08* (2006.01)
*F16M 13/02* (2006.01)
*F16M 11/20* (2006.01)

(52) U.S. Cl.
CPC ......... *F16M 11/046* (2013.01); *F16M 11/048* (2013.01); *F16M 11/08* (2013.01); *F16M 11/2014* (2013.01); *F16M 13/02* (2013.01); B31D 2205/0035 (2013.01); B31D 2205/0082 (2013.01); *F16M 2200/028* (2013.01); *F16M 2200/063* (2013.01)

(58) Field of Classification Search
CPC .... B31D 2205/0035; B31D 2205/0047; B31D 2205/0082; B66F 7/06; B66F 7/0616; F16M 11/046; F16M 11/048; F16M 11/08
USPC ................ 493/350, 352, 407, 464, 904, 967
See application file for complete search history.

(56) References Cited

U.S. PATENT DOCUMENTS

| | | | | |
|---|---|---|---|---|
| 5,582,495 | A * | 12/1996 | Schroeder | B60P 7/10 211/41.15 |
| 5,882,767 | A * | 3/1999 | Simmons, Jr. | B31D 5/0047 206/449 |
| 5,891,010 | A * | 4/1999 | Kobben | B31D 5/0047 242/598.2 |
| 6,179,765 | B1 * | 1/2001 | Toth | B26D 7/24 493/360 |
| 6,402,674 | B1 * | 6/2002 | Simmons, Jr. | B31D 5/0047 493/24 |
| 6,421,985 | B1 * | 7/2002 | Simmons, Jr. | B31D 5/0047 53/472 |
| 6,910,997 | B1 * | 6/2005 | Yampolsky | B26F 1/22 493/350 |
| 7,186,208 | B2 * | 3/2007 | Demers | B26F 3/02 493/350 |
| 8,920,299 | B2 * | 12/2014 | Keller | B31D 5/0043 493/464 |
| 2004/0142806 | A1 * | 7/2004 | Coppus | B31D 5/0047 493/350 |
| 2005/0181924 | A1 | 8/2005 | Demers | |
| 2007/0123406 | A1 * | 5/2007 | Demers | B26F 3/02 493/464 |
| 2008/0076653 | A1 * | 3/2008 | Shaw | B31D 5/006 493/464 |
| 2012/0165172 | A1 * | 6/2012 | Wetsch | B65H 35/008 493/352 |
| 2012/0289392 | A1 * | 11/2012 | Cheich | B31D 5/0047 493/464 |
| 2013/0237398 | A1 * | 9/2013 | Lintala | B31D 5/0043 493/464 |
| 2013/0313277 | A1 * | 11/2013 | Stewartson | B31D 5/0043 221/1 |
| 2014/0148324 | A1 * | 5/2014 | Chan | B31D 5/04 493/464 |
| 2015/0119224 | A1 * | 4/2015 | Orsini | B31D 5/0043 493/464 |
| 2015/0122758 | A1 * | 5/2015 | Telthorster | A47B 51/00 211/150 |

FOREIGN PATENT DOCUMENTS

| | | |
|---|---|---|
| DE | 102012110389 A1 | 4/2014 |
| JP | 67162738 U | 10/1982 |
| JP | 2006504599 A | 2/2006 |
| WO | 2016183454 A3 | 11/2016 |

* cited by examiner

STOCK SUPPLY ASSEMBLY AND METHOD FOR LOADING A DUNNAGE CONVERSION MACHINE

RELATED APPLICATIONS

This application is a national phase of International Patent Application No. PCT/US2016/032382 filed May 13, 2016 and published in the English language, and which claims priority to both U.S. Patent Application No. 62/315,967, filed Mar. 31, 2016, and U.S. Patent Application No. 62/161,122, filed May 13, 2015, all of which are hereby incorporated herein by reference.

FIELD OF THE INVENTION

The present invention relates to machines for converting sheet stock material into a dunnage packaging product and, more particularly, to a stock supply assembly and method of facilitating loading a new supply of sheet stock material for use by a dunnage conversion machine.

BACKGROUND

Dunnage conversion machines, also referred to as converters, generally convert a sheet stock material into a relatively less dense dunnage product that is useful as packaging to protect articles during shipment. Some converters produce a dunnage product primarily intended to fill voids in a packaging container to prevent the contents from shifting during shipment, while other converters produce a dunnage product that provides more cushioning from impact or vibration.

The sheet stock material usually is supplied in the form of a roll or a fan-folded stack from which the sheet stock material is paid off for conversion by the machine into the dunnage product. When the roll or stack of sheet stock material being supplied is spent, a new roll or stack is loaded in place of the spent supply, and the leading end of the new roll or stack is inserted into the converter. An exemplary converter is disclosed in commonly-owned U.S. Pat. No. 7,186,208, which is hereby incorporated herein by reference.

SUMMARY

The present invention provides an improved stock supply assembly and method for loading a dunnage conversion machine, particularly in a confined or obstructed space, such as over or across a conveyor. More particularly, the present invention provides a stock supply assembly having a linkage mechanism for moving a stock supply shelf between a relatively lower loading position and a relatively higher operating position. The linkage mechanism is mounted to a frame that also supports a dunnage conversion machine, in a configuration that maintains the orientation of the stock supply shelf relative to the dunnage conversion machine. The frame is mountable to a support arm that spaces the frame from a support member, and the frame is rotatable about a vertical axis and is spaced from the support member.

More particularly, the present invention provides a stock supply assembly for a dunnage conversion machine. The stock supply assembly a stock material support having a support structure that is movable between a relatively lower loading position and a relatively higher operating position vertically displaced relative to the loading position. The support structure maintains a consistent orientation as the support structure moves between the loading position and the operating position.

The support structure may include a shelf for supporting a stack of fan-folded sheet stock material, such as a horizontal shelf for supporting a stack of fan-folded sheet stock material.

An exemplary stock material support includes a linkage mechanism for moving the support structure between the loading position and the operating position. The linkage mechanism may include a pair of linkages connected to the support structure at laterally spaced locations that operate in tandem. The linkage mechanism may include a latching mechanism that engages and holds the support structure in the operating position. The latching mechanism may include a gravity latch. The latching mechanism may include a pair of spaced-apart gravity latches connected by a rod to operate in tandem. The linkage mechanism also may include a handle member that facilitates moving the stock support between the loading position and the operating position.

The stock material support may be mounted to a frame that is rotatable about a vertical axis.

The stock supply assembly may be provided in combination with a dunnage conversion machine. The dunnage conversion machine also may be mounted to the frame with the stock material support. The dunnage conversion machine converts a sheet stock material into a relatively thicker and less dense dunnage product. The sheet stock material may be paper, such as kraft paper, which is recyclable and composed of a renewable resource.

The linkage mechanism may include one or more segments connected to the dunnage conversion machine to rotate an upstream end of the conversion machine downward when the support structure is moved to the loading position to facilitate loading a leading end of a new supply of sheet stock material into the conversion machine.

The present invention also provides a method of loading a sheet stock material into a dunnage conversion machine for conversion into a relatively lower density dunnage product. The method includes the following steps: (a) lowering a stock material support structure from an elevated operating position to a relatively lower loading position, (b) loading a supply of sheet stock material onto the support structure at the loading position, (c) raising the support structure from the loading position to the operating position, and (d) feeding sheet stock material from the supply into a dunnage conversion machine and operating the dunnage conversion machine to produce one or more dunnage products from the supply of sheet stock material.

The method may further include the step of (e) rotating a stock supply assembly that includes the stock material support structure about a vertical axis, and the rotating step may include rotating the dunnage conversion machine.

The foregoing and other features of the invention are hereinafter fully described and particularly pointed out in the claims, the following description and the annexed drawings setting forth in detail plural illustrative embodiments of the invention, such being indicative, however, of but a few of the various ways in which the principles of the invention may be employed.

DETAILED DESCRIPTION

Figure 1:
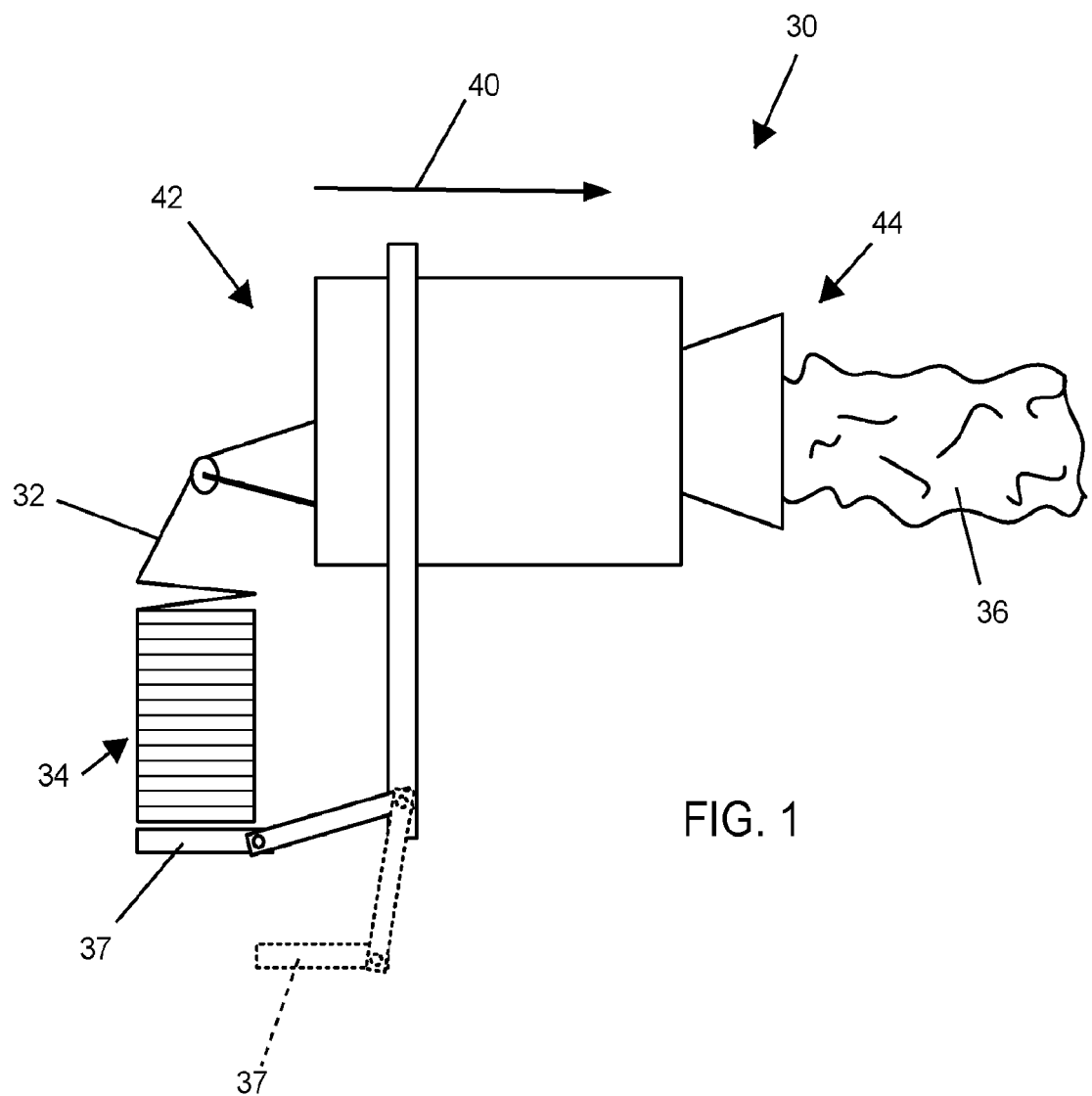
FIG. 1 is a schematic illustration of a dunnage conversion machine and stock supply assembly in accordance with the present invention.

Referring now to the drawings in detail and initially to FIG. 1, a schematic dunnage conversion machine is designated generally by reference number 30. As is further described below, the conversion machine 30 converts a sheet stock material 32 from a supply 34 thereof into a relatively lower density dunnage product 36, such as a randomly crumpled paper dunnage product.

The supply 34 of sheet stock material is a stock supply assembly 34 that includes a stock support structure, such as a shelf 37, and means for moving the shelf 37 or other stock support structure between a lower loading position (shown in broken lines) and a relatively higher operating position. Further details of an exemplary stock supply assembly will be discussed below.

The dunnage conversion machine 30 pulls the sheet stock material 32 from the supply 34 in a downstream direction 40 from an upstream end 42 of and through the conversion machine 30. The conversion machine 30 converts the stock material 32 into a relatively less dense dunnage product 36 that the conversion machine 30 dispenses from an outlet at a downstream end 44, opposite the upstream end 42.

The supply of stock material 34 generally is provided in a compact configuration, such as a roll of stock material (not shown) or a generally rectangular stack of fan-folded stock material as shown. The sheet stock material 32 includes one or more plies of sheet material. An exemplary sheet stock material is made of paper, such as kraft paper, for example thirty-pound basis weight kraft paper. Paper is biodegradable, recyclable, and composed of a renewable resource, making it an environmentally-responsible choice. But the present invention is not limited to use with paper. One or more of the plies may be made of another type of sheet material, such as a plastic sheet, or different types of paper, such as printed paper, bleached paper, fifty-pound kraft paper, or other sheet material, or combinations thereof. Because paper is reusable, recyclable, and composed of a renewable resource, it is an environmentally responsible choice as a stock material for conversion into a dunnage product.

Figure 2:
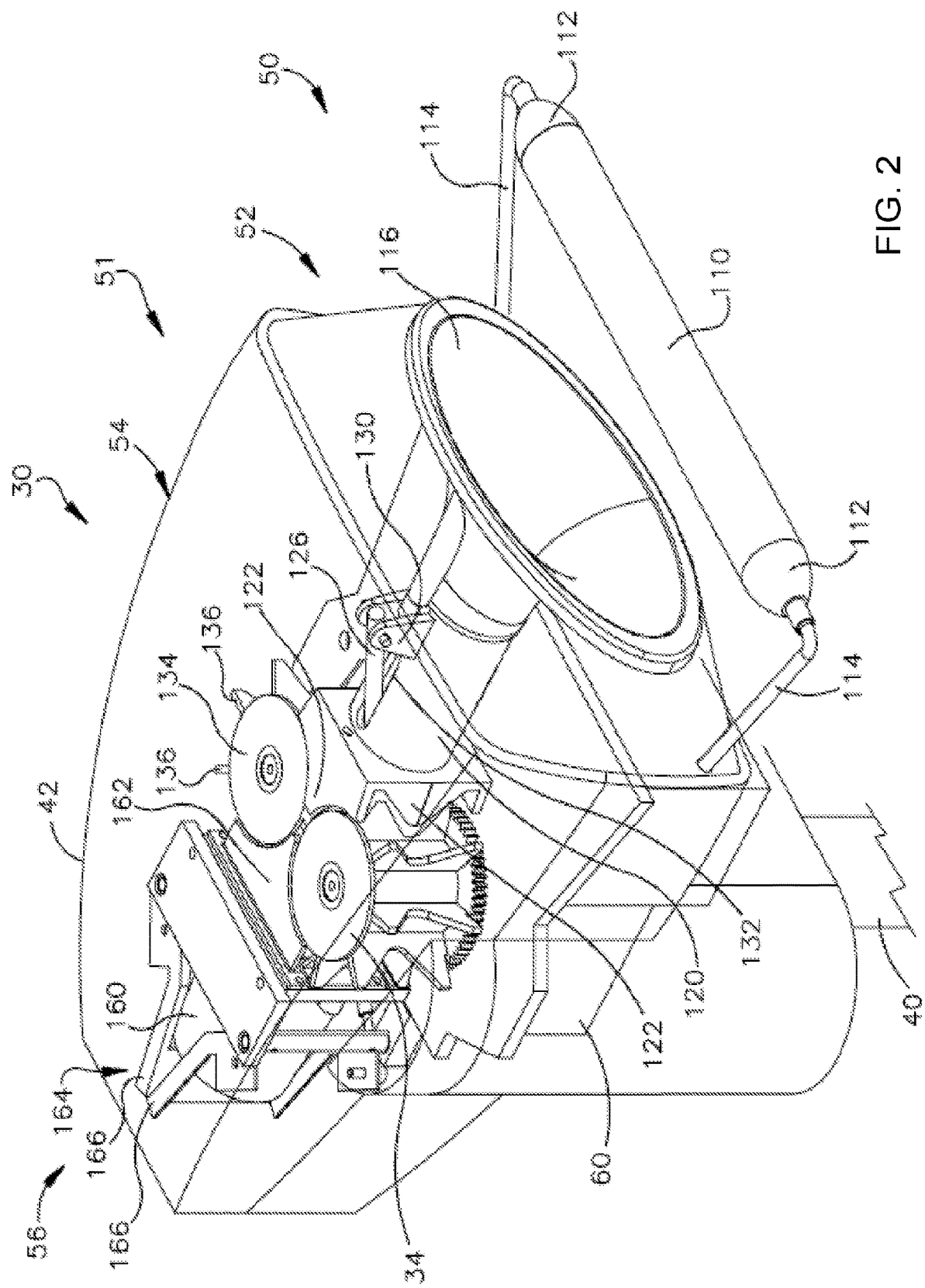
FIG. 2 is a rear perspective view of an exemplary dunnage conversion machine with the converter housing rendered transparent to show the internal components, and corresponds to FIG. 8 of commonly-owned U.S. Pat. No. 7,186,208.

An exemplary dunnage conversion machine 30 is shown in FIG. 2, and is described in further detail below. The present invention is not limited to the illustrated dunnage conversion machine, however.

Figure 3:
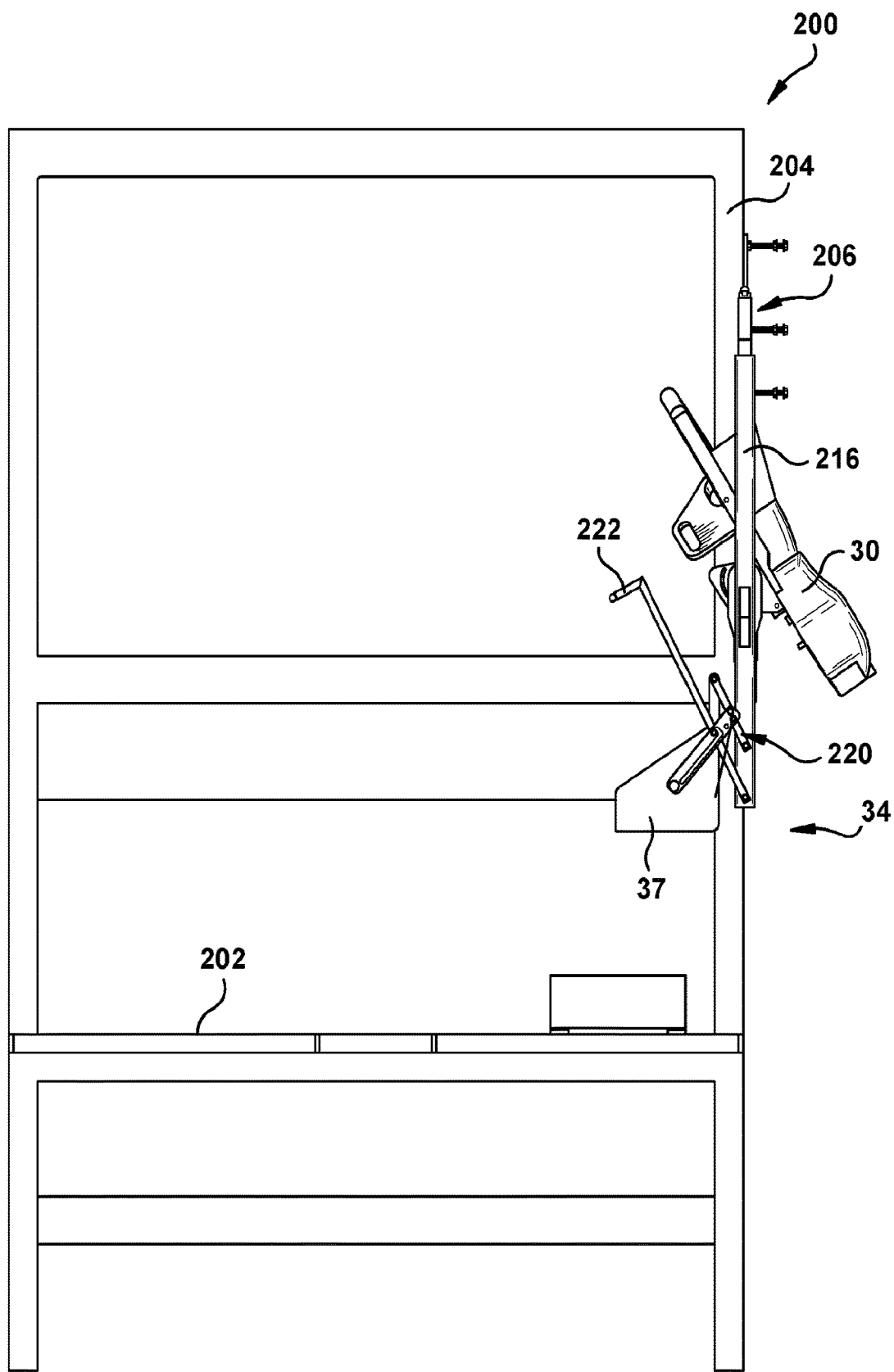
FIG. 3 is a side elevation view of a dunnage conversion machine and stock supply assembly in accordance with the present invention.
Figure 4:
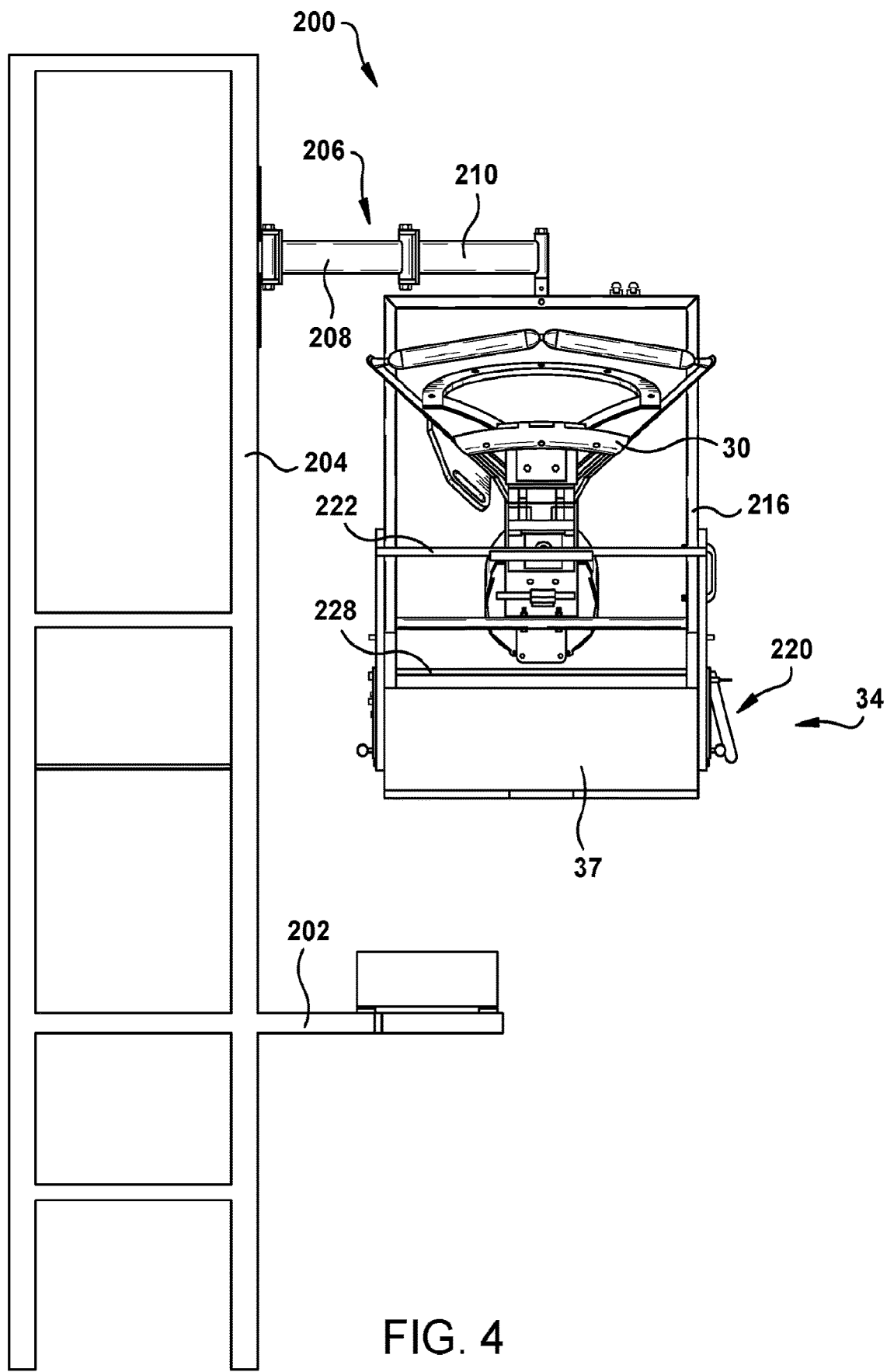
FIG. 4 is a rear elevation view of the dunnage conversion machine and stock supply assembly of FIG. 3.

FIGS. 3 and 4 show a packaging station 200 with a packing table 202 or other packing surface, such as a conveyor, on which a container may rest for packing. The packaging container may be a cardboard box, for example. A dunnage conversion machine 30 and a stock supply assembly 34 are mounted to a support member 204 at a location above the packing surface.

Figure 5:
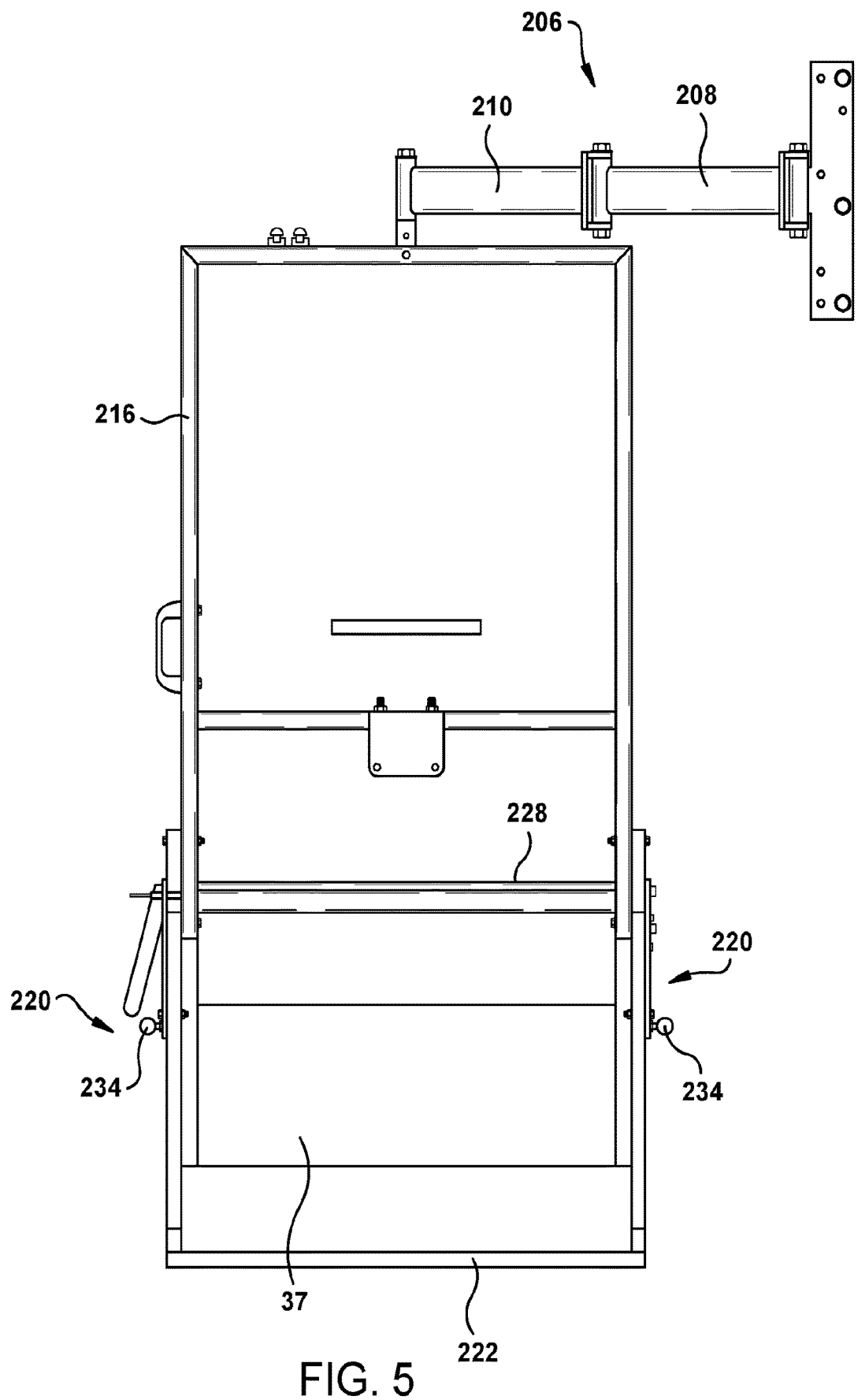
FIG. 5 is an enlarged rear elevation view of the stock supply assembly of FIG. 4.
Figure 6:
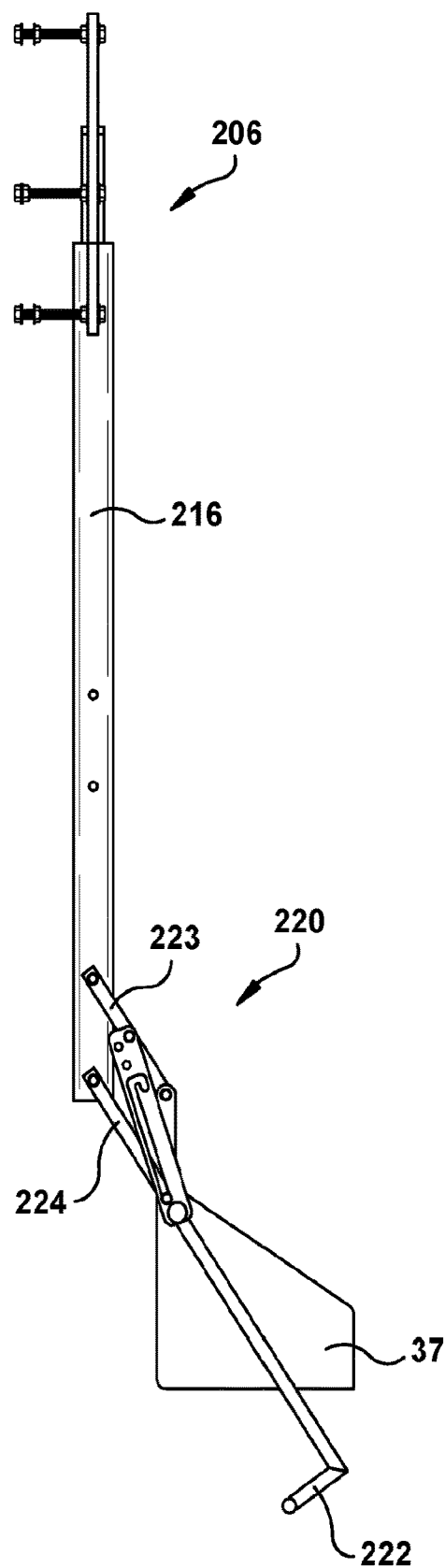
FIG. 6 is an enlarged side elevation view of the stock supply assembly of FIG. 3.

As shown in FIGS. 3 to 5, the dunnage conversion machine 30 and stock supply assembly 34 are mounted to a frame 216 that is connected to the support member 204 through a swing arm 206 that facilitates moving the converter 30 relative to the packaging surface 202 to an optimal position for dispensing dunnage toward the packaging container. The swing arm 206 includes two segments 208 and 210. A first segment 208 is pivotally mounted to the support member 204 for rotation about a first axis, and the second segment 210 is pivotally mounted relative to the first segment 208 for rotation about a second axis at their connecting ends. In the illustrated embodiment, both the first axis and the second axis are vertical.

The frame 216 supports the converter 30 and the stock supply assembly 34 and is in turn supported at a distal end of the swing arm 206, specifically at a distal end of the second segment 210 of the swing arm 206. More particularly, the frame 216 is mounted to the distal end of the swing arm 206 generally, and specifically to the second segment 210, and the converter 30 and the stock supply assembly 34 are mounted to the frame 216. Thus the frame 216 is rotatable about three generally parallel vertical axes at the joints between the swing arm 206 and the support member 204, between the first segment 208 and the second segment 210, and at the distal end of the second segment 210 where the swing arm 206 is connected to the frame 216

Since both the stock supply assembly 34 and the converter 30 are mounted to the frame 216, the stock supply assembly 34 can be aligned with the converter 30 and the frame 216 will help to ensure proper alignment of the sheet stock material 32 is maintained as it is fed into the converter 30. Rotating the frame 216 rotates both the converter 30 and the stock supply assembly 34 without changing the alignment of the converter 30 relative to the stock supply assembly 34.

The stock supply assembly 34 includes a support structure, in this case a stock supply shelf or tray 37, or other means for supporting a stack of fan-folded sheet stock material. Alternatively, the support structure may include a pair of spaced-apart supports for receiving and supporting an axle that supports a roll of sheet stock material for rotation about the axle as the stock material 32 is paid out to the converter 30.

In circumstances with limited space, it can be difficult for an operator to reach the supply tray 37 to load a new supply of stock material, such as a fan-folded stack of paper. The stock supply assembly 34 and its movable supply tray 37 make it easier to load a new stack of paper in a confined space, such as when the operator has to reach across and above a conveyor. And yet, the location of the supply tray 37 in its operating position must be high enough to not interfere with boxes being transported underneath it on a conveyor or other packing surface. This may define a desired mounting height requirement for the swing arm 206 on the support member 204. The height of the supply tray 37 at this mounting height, however, often is too high for many operators to easily re-load.

As mentioned above, the stock supply tray 37 is attached to the swing arm 206 via the frame 216 to maintain a consistent alignment of the supply tray 37 relative to an inlet at an upstream end of the converter 30 in all positions of operation. More particularly, the stock supply assembly 34 includes a linkage 220 that provides means for translating movement of the stock supply tray 37 relative to the frame 216 or other support without changing the orientation and alignment of the stock supply tray 37. The illustrated linkage 220 includes parallel segments 223 and 224 coupled between an upright portion of the frame 216 and the stock supply tray 37. The linkage 220 maintains an alignment of the tray 37 or other support structure relative to the conversion machine 30 while simultaneously horizontally and vertically translating the support structure 37 without rotating the stock supply tray 37. Thus the linkage 220 allows the stock supply tray 37 to be moved between an elevated operating position (FIG. 7) and a lowered loading position (FIG. 8) while maintaining the support tray 37 in a substantially horizontal orientation.

Figure 7:
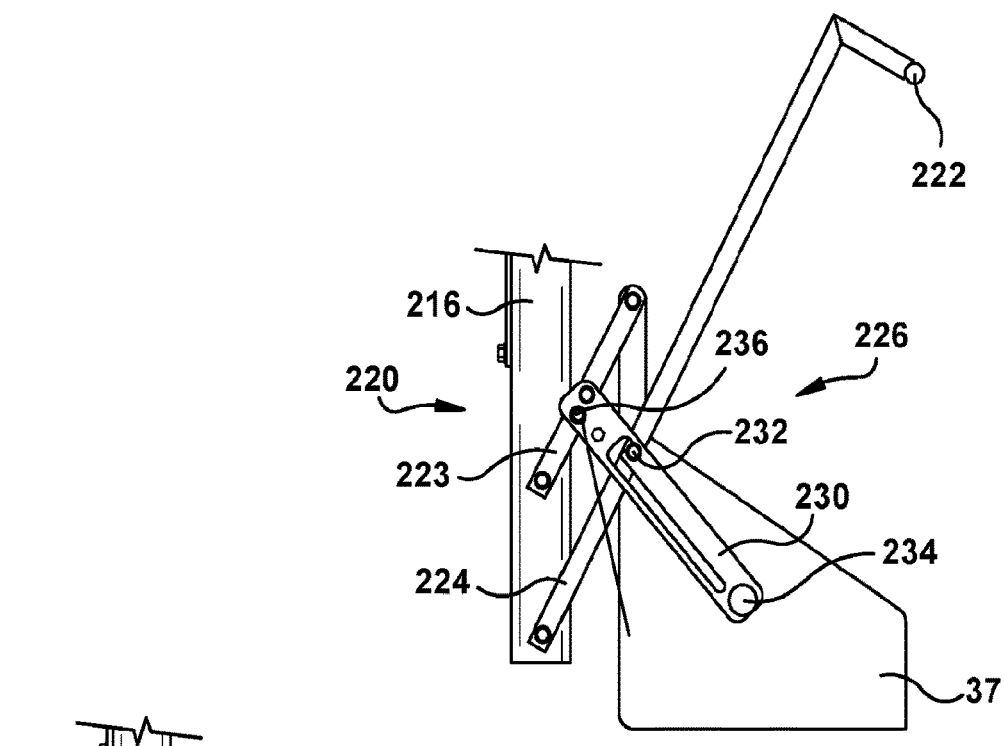
FIG. 7 is an enlarged side elevation view of a portion of the stock supply assembly in an upper, operating position.
Figure 8:
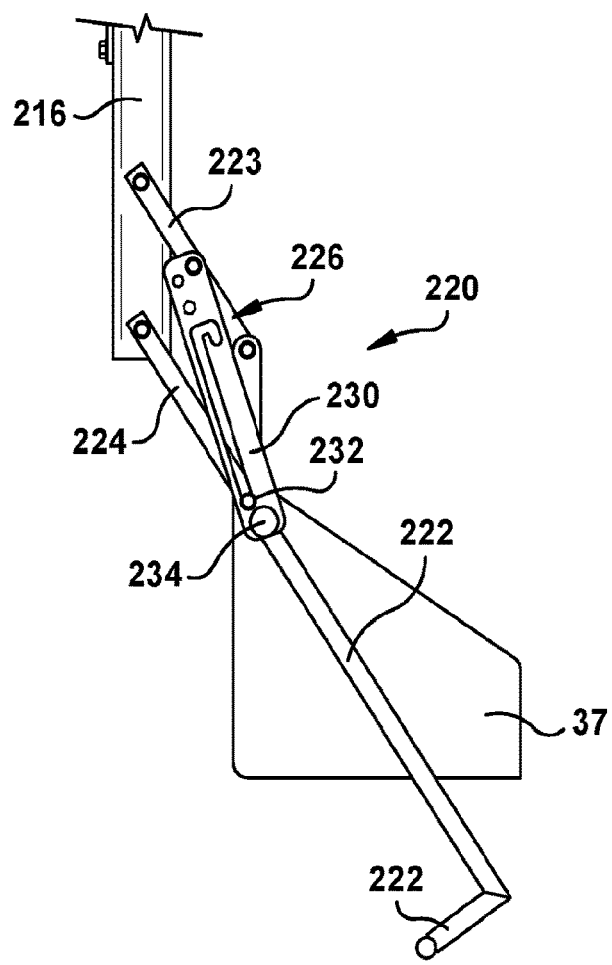
FIG. 8 is an enlarged side elevation view of the stock supply assembly of FIG. 7 in a lower, loading position.
Figure 9:
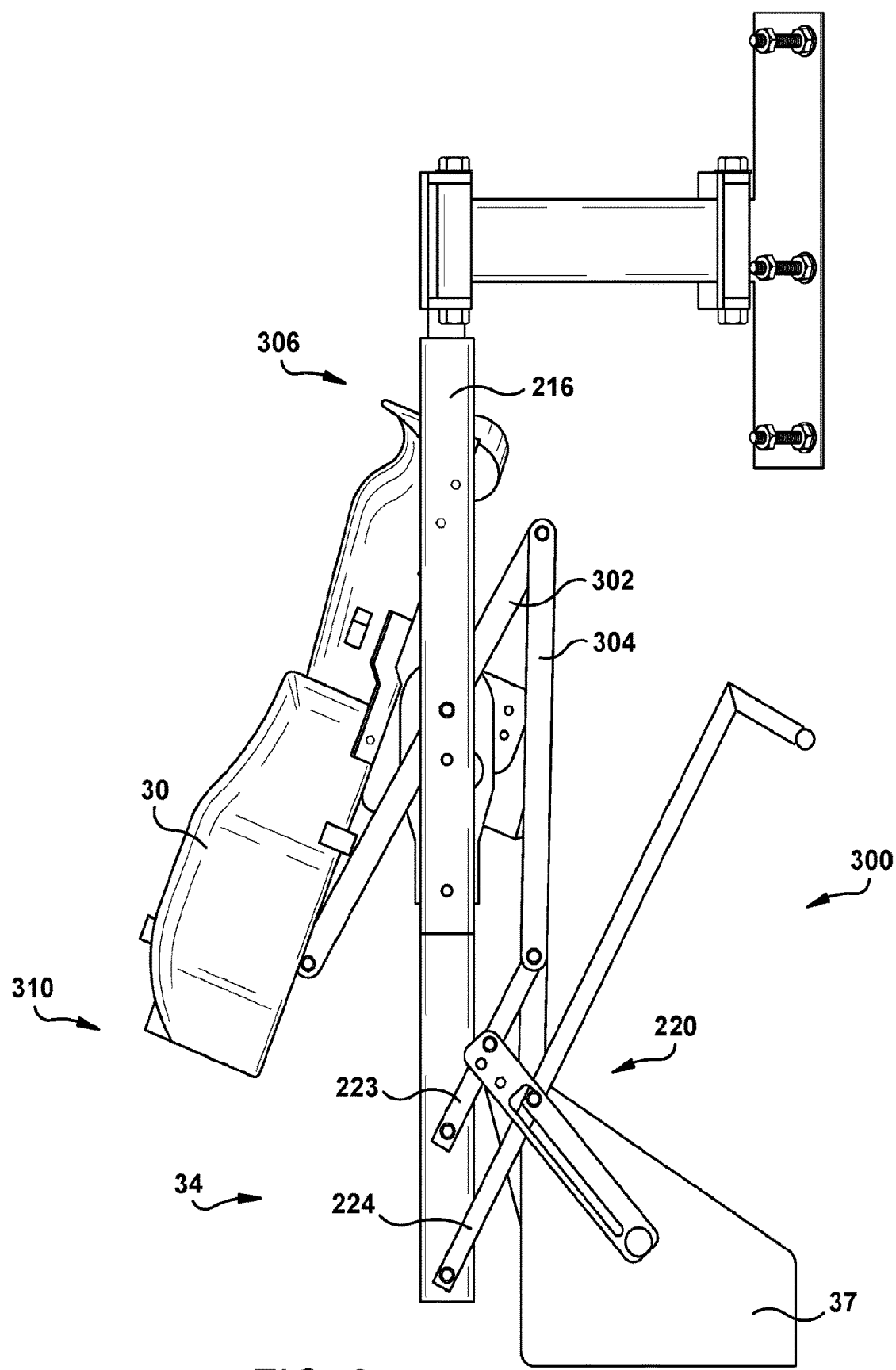
FIG. 9 is a side elevation view of another embodiment of a dunnage conversion machine and stock supply assembly in accordance with the present invention in an upper, operating position.
Figure 10:
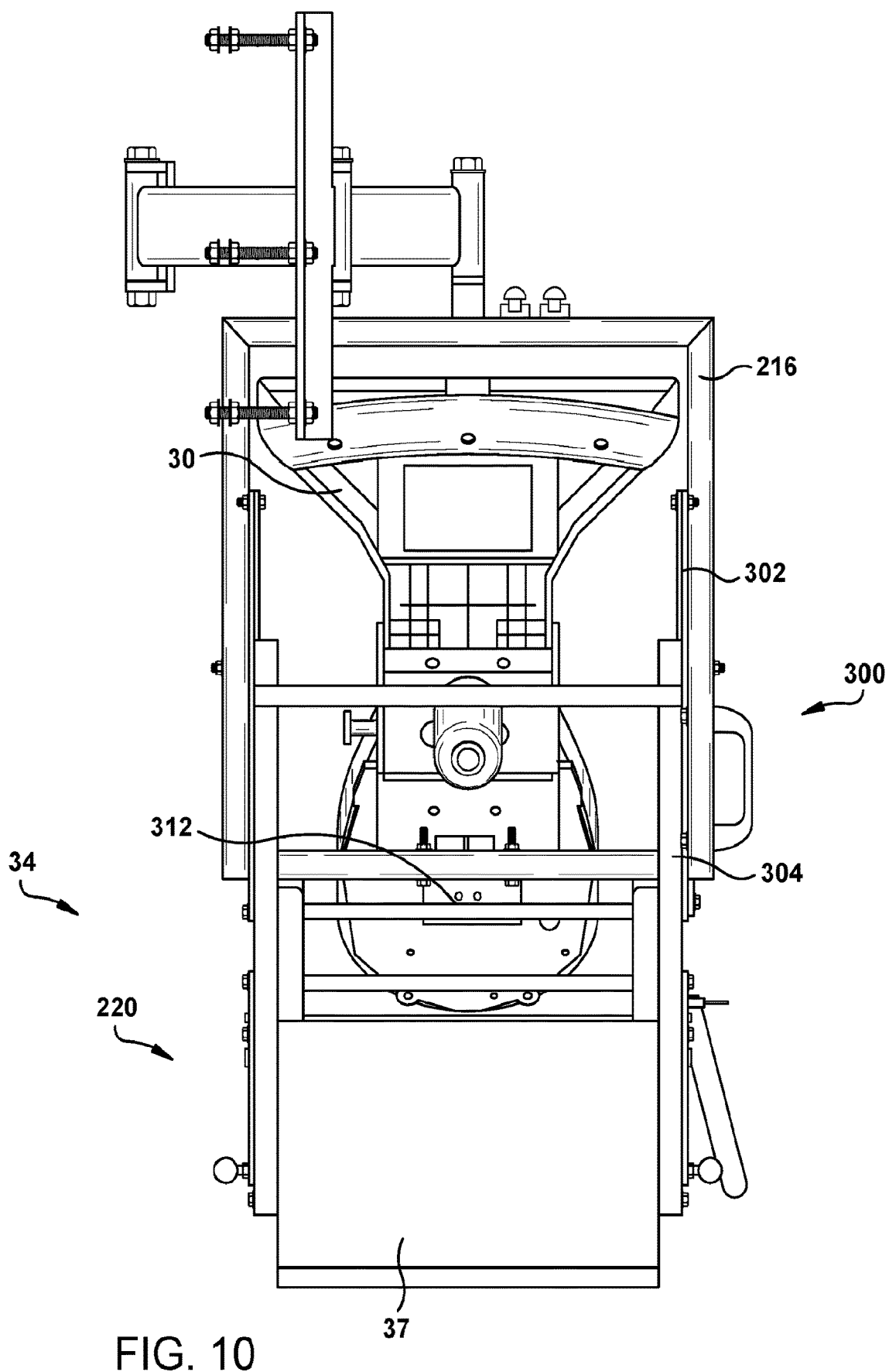
FIG. 10 is a rear elevation view of the dunnage conversion machine and stock supply assembly of FIG. 9.

Referring now to FIGS. 3 to 8, the stock supply assembly 34 further includes a lift bar 222 connected to the linkage 220 to raise and lower the stock supply tray 37. In the illustrated embodiment, the lift bar 222 connects distal ends of the spaced apart, parallel linkage segments 224 connected to respective sides of the stock supply tray 37. The linkage segments 223 and 224 are designed to maintain the tray 37 in a horizontal orientation throughout the movement of the tray 37 between the upper operating position (FIG. 7) and a relatively lower loading position (FIG. 8). For example, the tray 37 may move up and down about eighteen inches (about forty-six centimeters), however different height adjustments can be achieved by modifying the lengths and attachment points for the linkage segments 223 and 224. When the tray 37 reaches its uppermost operating position, a latch system may be used to lock the tray in place.

The illustrated latch system provided by the linkage 220, best seen in FIGS. 7 and 8, includes a pair of gravity latches 226 integrated with the linkage segments 223 and 224 on each side of the tray 37 to hold the tray 37 in a desired position, particularly the raised operating position. The latches 226 are tied together by a connecting bar 228 such that both latches 226 engage into the locked position simultaneously, in tandem, when the tray 37 is fully raised to the operating position. The illustrated gravity latch 226 includes a linkage segment or latch member 230 that is pivotally mounted to the upper linkage segment 223 and a pin 232 extending transverse the latch member 230, protruding from an outer side of the lower linkage segment 224. The latch member 230 has a longitudinally-extending slot with a latching notch extending transverse the slot at a distal end. The pin 232 is received within and preferably retained in the slot at all times. When the tray 37 is raised to the operating position (FIG. 7), the pin 232 moves along the slot and is received in the latching notch in the latch member 230, thereby retaining the tray 37 in its operating position. The notch typically has a length that is greater than the diameter of the pin 232. As a result, inadvertent bumps or vibration or other events will not dislodge the pin 232 from the notch or otherwise disengage the latch system from its locked position. Lifting the tray 37 and moving the latch member 230 upward until the pin 232 exits the notch disengages the latch system and allows the tray to be lowered to the loading position (FIG. 8). A knob 236 on a distal end of the latch member 230, opposite the pivot point on the linkage segment 223, facilitates lifting the latch member 230.

After the gravity latches 226 are engaged in the operating position, a safety pin 236 may be used to lock the linkage segments 223 and 224 in place. The safety pin 234 can only be inserted if the tray 37 is fully raised to the operating position and property latched. The safety pin 236 may be permanently attached to a lanyard that permits the safety pin 236 to hang below the tray 37 out of the way when the tray has been lowered for loading, or the safety pin 236 may be provided as a spring-loaded pin permanently secured to the latch member 230. Either way, the safety pin 236 is inserted through aligned openings in the latch member 230 and the linkage 220, particularly linkage segment 223 in the illustrated embodiment, or a side of the tray 37, when the tray 37 is in the operating position.

To lower the tray 37, the safety pin 236 must be removed and the latch system must be disengaged before the operator can lower the support tray 37 using the lift bar 222 to access the tray 37 and the converter 30.

An alternative linkage mechanism 300 is shown in combination with the conversion machine 30 and stock supply assembly 34 in FIGS. 9 to 12. The linkage mechanism 300 includes the linkage 220 described above, connecting the stock support structure, including the tray 37, to the frame 216. In this embodiment, however, the linkage 300 also includes linkage segments 302 and 304 connecting the dunnage conversion machine 30 to the tray 37 or other stock support structure to rotate an upstream end 306 of the conversion machine 30 downward when the tray 37 is moved to the loading position to facilitate loading a leading end of a new supply of sheet stock material into the conversion machine 30. This lowers the height of the inlet at the upstream end 306 of the conversion machine 30, where the paper enters the dunnage conversion machine 30, making it easier not only to lift a new supply of stock material onto the lowered support tray 37, but also automatically rotates the dunnage conversion machine 30 to make it easier to feed a leading end of the new supply of sheet stock material into the conversion machine 30.

Figure 11:
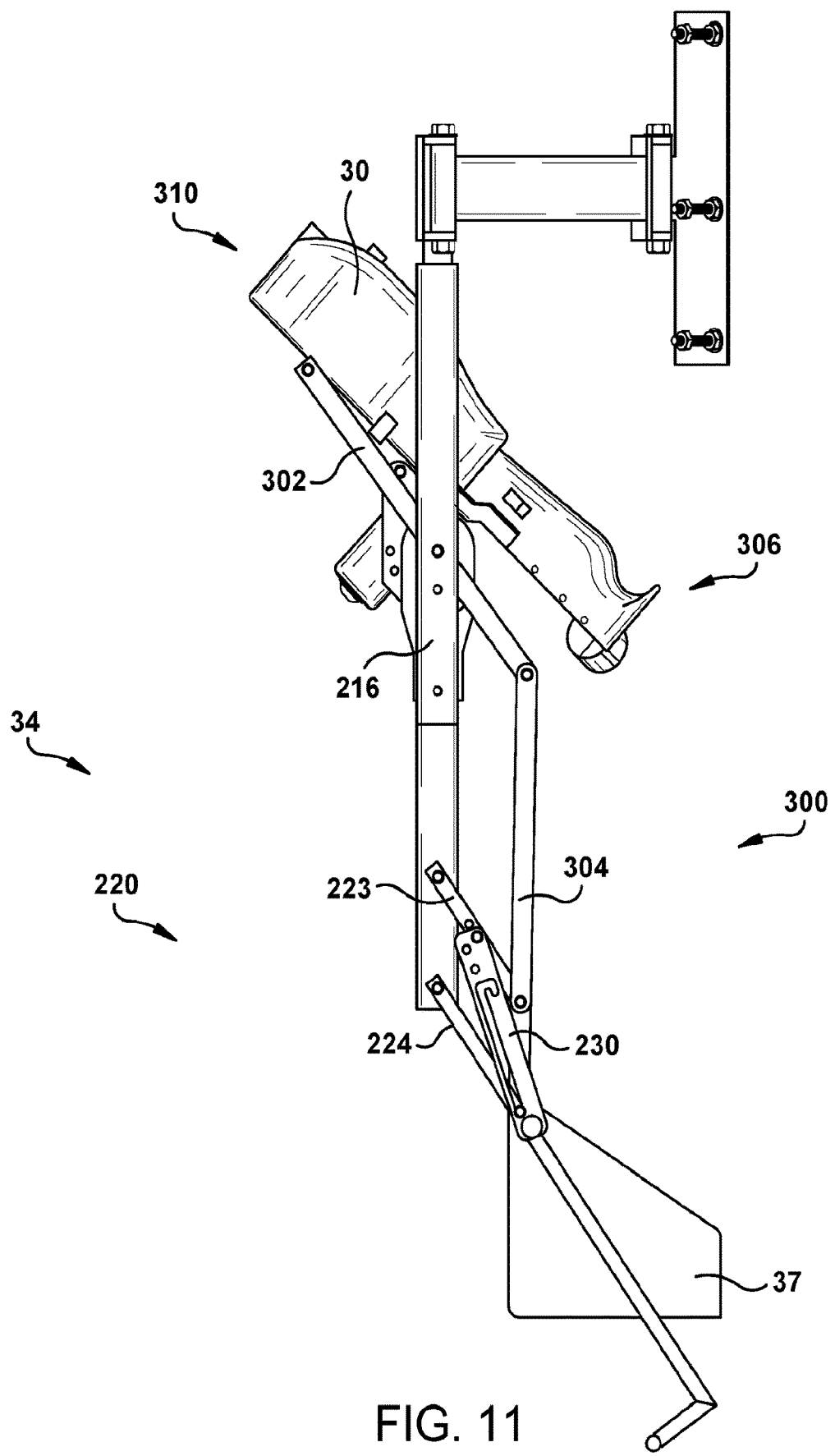
FIG. 11 is a side elevation view of the dunnage conversion machine and stock supply assembly of FIG. 9 in a lower, loading position.
Figure 12:
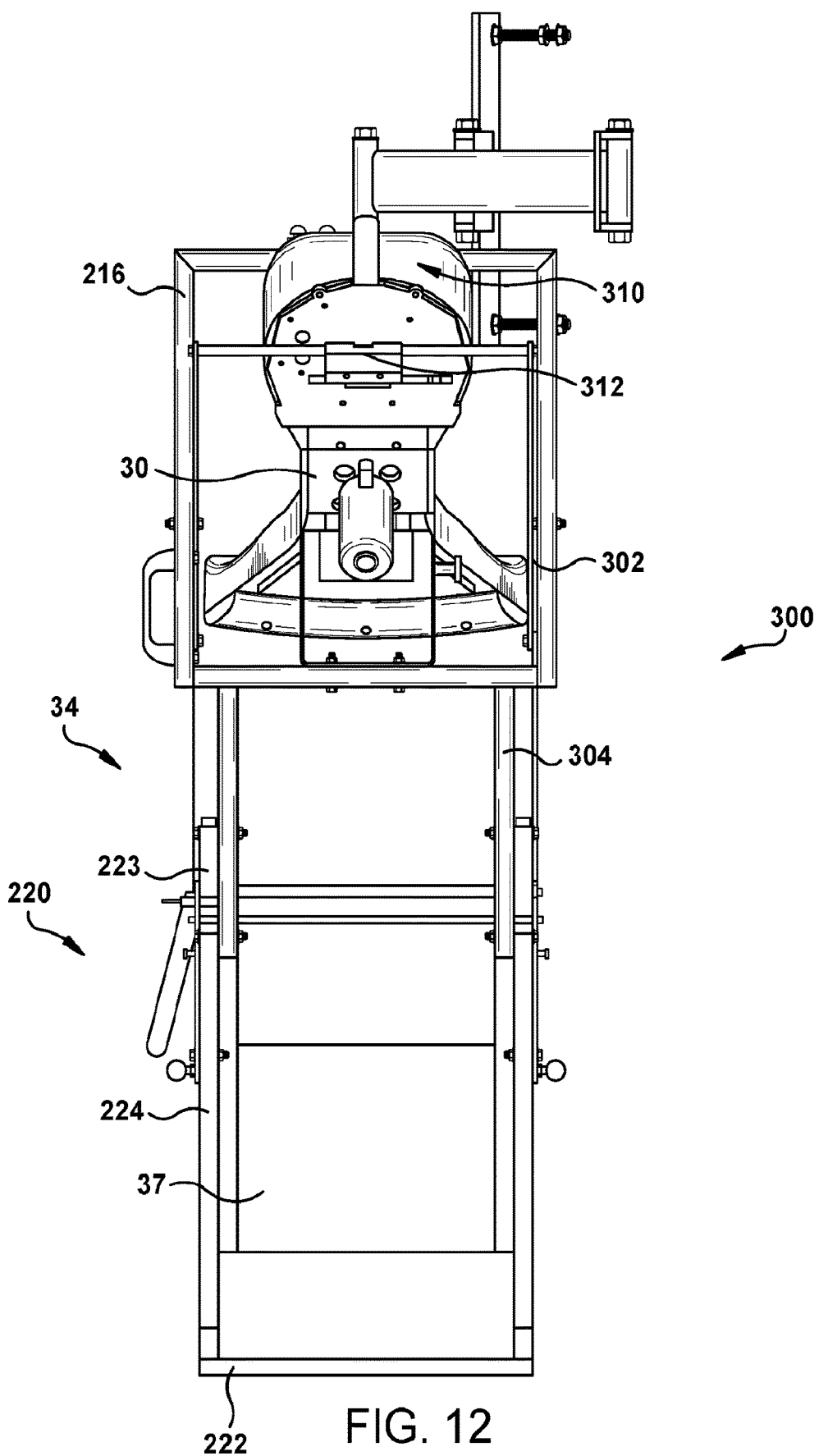
FIG. 12 is a rear elevation view of the dunnage conversion machine and stock supply assembly of FIG. 11.

In an operating position (FIGS. 9 and 10), the conversion machine 30 is oriented to direct dunnage products exiting an outlet at a downstream end 310 of the conversion machine 30 downward to a packaging station. As a result, the inlet at the upstream end 306, opposite the downstream end 310, is elevated and difficult to reach to reload the conversion machine 30. In the previous embodiment, the operator had to manually rotate the conversion machine 30 in a separate step to reach the inlet at the upstream end 306. The linkage 300 automatically rotates the conversion machine 30 from the downwardly-facing downstream end 310 orientation of FIGS. 9 and 10 to the downwardly-facing upstream end 306 orientation of FIGS. 11 and 12 when the tray 37 or other stock support is moved from its operating position (FIGS. 9 and 10) to its relatively lower loading position (FIGS. 11 and 12).

As in the previous embodiment, the dunnage conversion machine 30 and stock supply assembly 34 are mounted to the frame 216 and aligned to facilitate feeding the stock material from the tray 37 into the conversion machine 30. The linkage mechanism 300 includes a pivot bracket 312 mounted to the dunnage conversion machine 30, and the linkage segments 302 and 304 connecting the pivot bracket 312 to the linkage segments 232 and the tray 37. The illustrated linkage 300 also may be balanced such that the use of a safety pin is no longer required.

An exemplary dunnage conversion machine is shown in FIG. 2, which corresponds to FIG. 8 of commonly-owned U.S. Pat. No. 7,186,208. The converter 30 includes a conversion assembly 51 for converting the stock material supplied from the stock supply assembly 34 (FIG. 1) into a strip of dunnage. The illustrated conversion assembly 51 generally comprises a forming assembly 52 downstream of the stock supply assembly 34, and a feeding assembly 54 downstream of the forming assembly 52. The feeding assembly 54 pulls the stock material from the stock supply assembly and through the forming assembly. The forming assembly 52 inwardly gathers and randomly crumples the stock material 32 into the shape of a generally round strip. Operation of the feeding assembly 54 is controlled by a controller 60 that can be located remotely or, as shown, mounted in a housing.

In the illustrated embodiment, a constant entry member or guide 110 mounted at the upstream end of the housing defines a substantially constant entry point for the stock material 32 entering the forming assembly 52 as the feeding assembly 54 draws the stock material through the conversion assembly. From the constant entry member 110, the stock material 32 flows through a gathering chute 116 that forms part of the forming assembly 52. The gathering chute, which has a funnel shape in the illustrated embodiment, inwardly gathers and crumples the stock material 32 as the stock material is being pulled through the gathering chute. The converging guide surfaces of the gathering chute define a progressively smaller cross-sectional area whereby the stock material is turned in on itself and crumpled to form a strip of dunnage having generally longitudinally extending crumpled lobes.

From the gathering chute 116, the crumpled strip of stock material 32 flows through an inlet guide chute 120 that can form a continuation of the narrow end of the gathering chute 116. The inlet guide chute guides the stock material 32 to the feeding assembly 54. In the illustrated embodiment, the guide chute 120 is generally tubular and has a diameter at an upstream end that is about equal to the adjacent downstream end of the gathering chute 116. This portion of the guide chute 120 circumferentially constrains the stock material passing therethrough. At a downstream end of the inlet guide chute 120, the chute has one or more flanges or fingers 122 that correspond to the shape of the upstream end of the feeding assembly 54. The inlet guide chute 120 thus defines a continuous path for the flow of sheet stock material 32 from the gathering chute 116 to the feeding assembly 54.

The illustrated feeding assembly 54, has a pair of opposed feed members 134 that include grippers 136. The grippers 136 engage the strip of dunnage 34 on generally opposite sides to pull the stock material 32 from the stock supply assembly 34 (FIG. 1) and through the forming assembly 52. In the illustrated embodiment the feed members 134 have a configuration similar to a pair of paddle wheels. These paddle wheels 134 are driven by a motor 140, for example, a rotary electric motor 140 and corresponding gears 141, 142 in a gear train. The controller 60 controls operation of the motor 140, which in turn controls the operation of the feeding assembly 54 to move the stock material in both forward and reverse directions.

From the feeding assembly 54, a downstream or outlet guide chute 160 guides the strip of dunnage 36 (FIG. 1) out of the converter 30. The sheet stock material may have perforations or other weakened regions extending across the width of the sheet material at longitudinally-spaced locations, such as at the fold lines of a fan-folded sheet stock material. These weakened regions facilitate separating a length of dunnage from the strip.

The present invention also provides a method of loading a sheet stock material into a dunnage conversion machine for conversion into a relatively lower density dunnage product. The method includes the following steps: (a) lowering a stock material support structure from an elevated operating position to a relatively lower loading position, (b) loading a supply of sheet stock material onto the support structure at the loading position, (c) raising the support structure from the loading position to the operating position, and (d) feeding sheet stock material from the supply into a dunnage conversion machine and operating the dunnage conversion machine to produce one or more dunnage products from the supply of sheet stock material.

The method may further include the step of (e) rotating a stock supply assembly that includes the stock material support structure about a vertical axis, i.e., rotating the frame, and the rotating step may include rotating the dunnage conversion machine. The rotating step may occur before operating the dunnage conversion machine.

The step (a) of lowering a stock material support structure may include rotating a dunnage conversion machine about a horizontal axis to lower an upstream end of the conversion machine, the step (b) of loading a supply of sheet stock material may include loading a leading end of the sheet stock material into the dunnage conversion machine, and the step (c) of raising the support structure may include rotating the conversion machine about the horizontal axis to lower a downstream end of the conversion machine opposite the upstream end to direct dunnage products to a packaging station.

The lowering step may include removing a safety pin before lowering the support structure, and the raising step may include inserting a safety pin after raising the support structure. Loading the supply of sheet stock material may include placing a stack of fan-folded sheet stock material on a support structure, such as a shelf or tray, and the feeding step may include feeding a leading end of the sheet stock material into a dunnage conversion machine.

In summary, the present invention provides a stock supply assembly 34 for a dunnage conversion machine 30 that includes a stock material support having a support structure, such as a shelf 37 for a stack of fan-folded sheet stock material 32. The shelf 37 is movable between a relatively lower loading position and a relatively higher operating position vertically displaced relative to the loading position. In the process, the support structure maintains a consistent orientation as the support structure moves between the loading position and the operating position.

Although the invention has been shown and described with respect to certain embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiments of the invention. In addition, while a particular feature of the invention may have been described above with respect to only one of several illustrated embodiments, such feature may be combined with one or more other features of the other embodiments, as may be desired and advantageous for any given or particular application.

The invention claimed is:

1. A combination of a stock supply assembly and a dunnage conversion machine,
wherein the stock supply assembly includes:
a frame that is rotatable about a vertical axis; and
a stock material support having a support structure that is movable relative to the frame between a relatively lower loading position and a relatively higher operating position vertically displaced relative to the loading position,
wherein the stock material support includes a linkage mechanism that connects the stock material support to the frame for moving the support structure between the loading position and the operating position and the support structure maintains a consistent orientation as the support structure moves between the loading position and the operating position;
wherein the dunnage conversion machine converts a sheet stock material into a relatively thicker and less dense dunnage product;
wherein the dunnage conversion machine is mounted to the frame; and
wherein the linkage mechanism includes one or more segments that connect the support structure to the dunnage conversion machine, the linkage mechanism being configured to rotate an upstream end of the dunnage conversion machine downward when the support structure is moved to the loading position to facilitate loading a leading end of a new supply of sheet stock material into the conversion machine.

2. A stock supply assembly as set forth in claim 1, where the support structure includes a shelf for supporting a stack of fan-folded sheet stock material.

3. A stock supply assembly as set forth in claim 1, where the support structure includes a horizontal shelf for supporting a stack of fan-folded sheet stock material.

4. A stock supply assembly as set forth in claim 1, where the linkage mechanism includes a pair of linkages connected to the support structure at laterally spaced locations that operate in tandem.

5. A stock supply assembly as set forth in claim 4, where the latching mechanism includes a pair of spaced-apart gravity latches connected by a rod to operate in tandem.

6. A stock supply assembly as set forth in claim 1, where the linkage mechanism includes a latching mechanism that engages and holds the support structure in the operating position.

7. A stock supply assembly as set forth in claim 6, where the latching mechanism includes a gravity latch.

8. A stock supply assembly as set forth in claim 1, where the linkage mechanism includes a handle member that facilitates moving the stock support between the loading position and the operating position.

9. An assembly comprising:
a stock material support having a support structure and a linkage mechanism configured for moving the support structure between a relatively lower loading position and a relatively higher operating position vertically displaced relative to the loading position;
a dunnage conversion machine configured for converting a sheet stock material drawn from the stock material support into a relatively thicker and less dense dunnage product; and
a frame that supports the stock material support and is rotatable about a vertical axis;
wherein the dunnage conversion machine is mounted to the frame for rotation relative to the frame about a horizontal axis;
wherein the support structure maintains a consistent orientation as the support structure moves between the loading position and the operating position;
wherein the linkage mechanism includes one or more segments that connect the support structure to the dunnage conversion machine, the linkage mechanism being configured to rotate the dunnage conversion machine about a horizontal axis such that an upstream end of the dunnage conversion machine moves downward when the support structure is moved to the loading position to facilitate loading a leading end of a new supply of sheet stock material into the conversion machine, and moves upward when the support structure is moved to the operating position.

10. An assembly as set forth in claim 9, where the support structure includes a shelf for supporting a stack of fan-folded sheet stock material.

11. An assembly as set forth in claim 10, where the support structure includes a horizontal shelf for supporting a stack of fan-folded sheet stock material.

12. An assembly as set forth in claim 9, where the linkage mechanism includes a pair of linkages connected to the support structure at laterally spaced locations that operate in tandem.

13. An assembly as set forth in claim 9, where the linkage mechanism includes a latching mechanism that engages and holds the support structure in the operating position.

14. An assembly as set forth in claim 13, where the latching mechanism includes a gravity latch.

15. An assembly as set forth in claim 14, where the latching mechanism includes a pair of spaced-apart gravity latches connected by a rod to operate in tandem.

16. An assembly as set forth in claim 9, where the linkage mechanism includes a handle member that facilitates moving the stock support between the loading position and the operating position.

* * * * *